Nov. 8, 1927.

G. T. HERALD 1,648,683

ARC WELDING

Filed Oct. 25, 1924

Inventor:
Gardner T. Herald,
by
His Attorney.

Patented Nov. 8, 1927.

1,648,683

UNITED STATES PATENT OFFICE.

GARDNER T. HERALD, OF WESTFIELD, NEW JERSEY, ASSIGNOR TO GENERAL ELECTRIC COMPANY, A CORPORATION OF NEW YORK.

ARC WELDING.

Application filed October 25, 1924. Serial No. 745,928.

My invention relates to electric arc welding, and has for its object the provision of an improved backing member arranged to prevent the rapid abstraction of heat from the parts while they are being welded together.

In the welding together of metal parts by means of an electric arc, it is desirable that the heat of the arc be utilized so as effectively to weld the parts clear down to the bottom of the opening between their meeting edges. The facility with which this result is accomplished depends on the heat conducting properties both of the parts to be welded and of the backing plate or member upon which the parts to be welded are laid or clamped. Thus, in the case of a backing plate made of copper, for example, the heat is rapidly abstracted from the parts being welded and the weld may be defective between the edges which lie directly upon the backing strip. In accordance with my invention, this difficulty is avoided by roughening or knurling the surface of the backing member to produce a plurality of projections and depressions which form air pockets which serve to retard the transfer of heat between the work and the backing member.

My invention will be better understood from the following description when considered in connection with the accompanying drawing and its scope will be pointed out in the appended claims.

Figure 1:
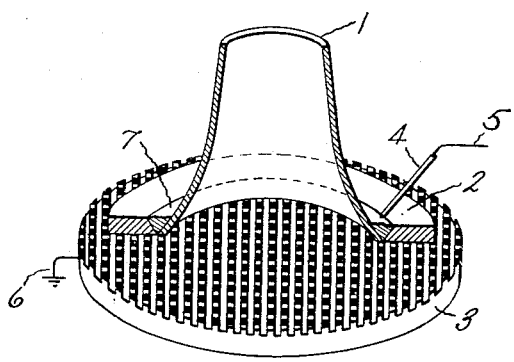
Figure 2:
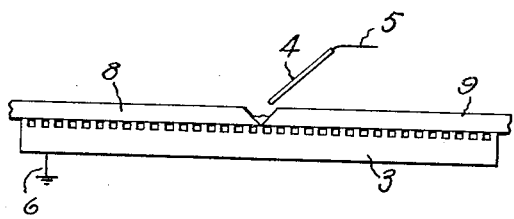

Referring to the drawing, Fig. 1 shows my invention as utilized in welding a flange to a pipe or nozzle; and Fig. 2 shows it as utilized in welding together a pair of metal plates.

Fig. 1 shows a nozzle or pipe 1 arranged at one end to have its edge in juxtaposition to the inner periphery of a flange which, together with the nozzle 1, is supported on a backing plate 3. As indicated by the drawing, the surface of the backing plate 3 is roughened or knurled to prevent the ready transmission of heat between the backing plate 3 and the metal parts 1 and 2 which are to be welded together. Heat for performing the welding operation is derived from an arc formed between the electrode 4 and the parts to be welded together. The circuit through which current is transmitted to this arc is indicated by the lead 5 and the ground 6. The metal 7 by which the parts 1 and 2 are fused together may be deposited from the electrode 4. Fig. 2 differs from Fig. 1 merely in that it shows the work to be welded as comprising a pair of plate members 8 and 9.

While I have referred to the backing member as having a knurled surface, it is apparent that the backing member may have its surface otherwise treated to facilitate the formation of heat insulating pockets between the work and backing plate. I therefore aim to cover by the appended claims any arrangement in which the backing plate is roughened to form pockets by which a substantial measure of heat insulation is afforded between the work and the backing member.

What I claim as new and desire to secure by Letters Patent of the United States, is,—

1. The method of joining the edges of metal parts which comprises positioning said edges in juxtaposition, backing said metal parts along said edges at a plurality of closely adjacent metallic contact points of small area, and directing a welding arc against said edges to unite them by fusion.

2. The method of electric arc welding which comprises maintaining an arc between the work as one electrode and a fusible metallic pencil as the other electrode, while backing the work upon a plurality of closely adjacent spaced metallic points.

3. A backing member for electric arc welding having a knurled work supporting surface.

4. A backing member for electric arc welding comprising a copper member provided with a knurled surface for the purpose described.

5. A metallic backing member for electric arc welding provided with a work supporting surface portion of low heat conducting capacity.

6. A metallic backing member for electric arc welding having its work supporting surface roughened.

In witness whereof, I have hereunto set my hand this 20th day of October, 1924.

GARDNER T. HERALD.